Sept. 15, 1953

M. C. MAGARIAN

BEARING MOUNT FOR DISK PLOWS 2,652,291

Filed Oct. 2, 1950

INVENTOR.
M. C. Magarian
BY
ATTORNEYS

Sept. 15, 1953     M. C. MAGARIAN     2,652,291
BEARING MOUNT FOR DISK PLOWS
Filed Oct. 2, 1950     2 Sheets-Sheet 2

Inventor
M. C. Magarian

Patented Sept. 15, 1953

2,652,291

UNITED STATES PATENT OFFICE 2,652,291

BEARING MOUNT FOR DISK PLOWS

Masick C. Magarian, Fresno, Calif.

Application October 2, 1950, Serial No. 187,971

2 Claims. (Cl. 308—29)

This invention relates generally to disc plows; the invention being directed in particular to, and it is a major object to provide, a novel mount for securing the bearings—at the ends of the disc gang—to the implement frame.

In disc plows it is essential that the bearings be secured to the implement frame in a manner to prevent misalinement on the center shaft of the disc gang. Otherwise, undesirable wear occurs, grease seals fail, and repair becomes necessary.

It is therefore an important object of this invention to provide a mount by means of which the bearings of disc plows may be readily initially secured to the implement frame with proper shaft alinement, and thereafter the mount maintains such alinement although the frame may distort to a certain degree when the implement is in use.

Another object of the invention is to provide a mount, for self-alining of the bearings, which permits the bearings to automatically adjust about a vertical axis and a horizontal axis; said axes intersecting each other and the axis of the central shaft so as to attain a better or more balanced alinement of said bearings.

It is also an object of the invention to provide a bearing mount for disc plows which is designed for ease and economy of manufacture.

Still another object of the invention is to provide a practical and reliable bearing mount for disc plows, and yet one which will be exceedingly effective for the purpose for which it is designed.

These objects are accomplished by means of such structure and relative arrangement of parts as will fully appear by a perusal of the following specification and claims.

Figure 1:
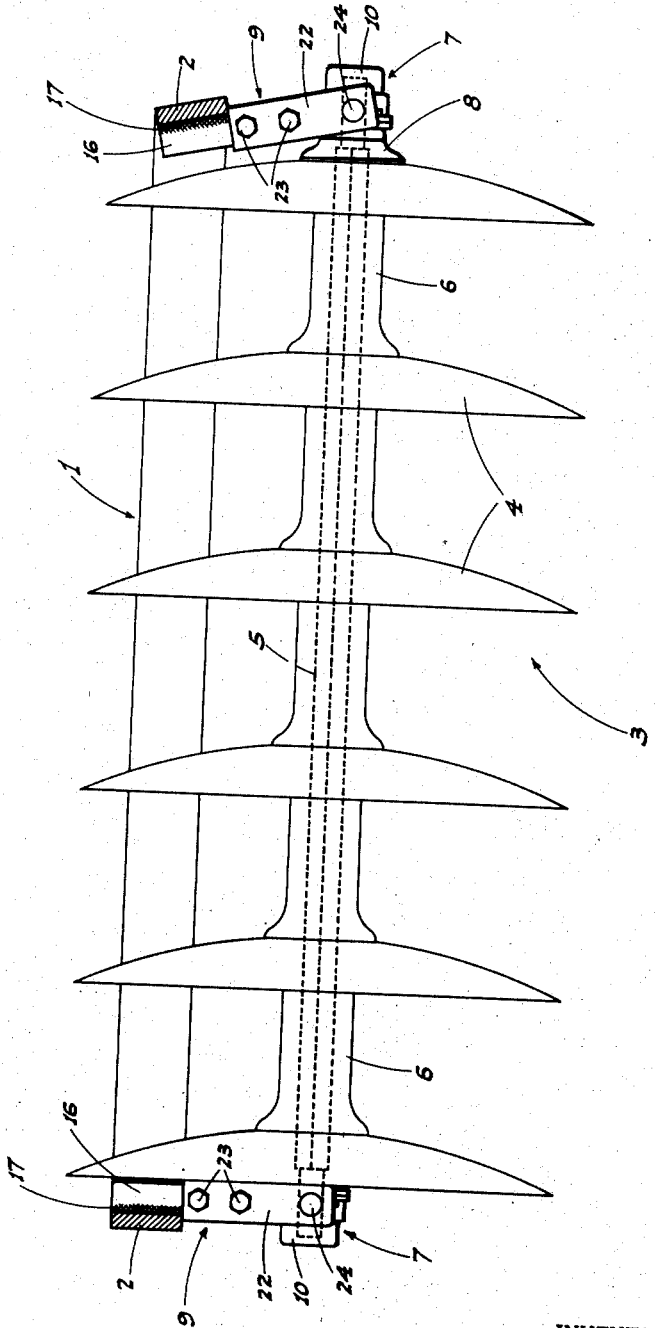
Fig. 1 is an elevation of a disc gang secured to an implement frame by the improved mounts.
Figure 2:
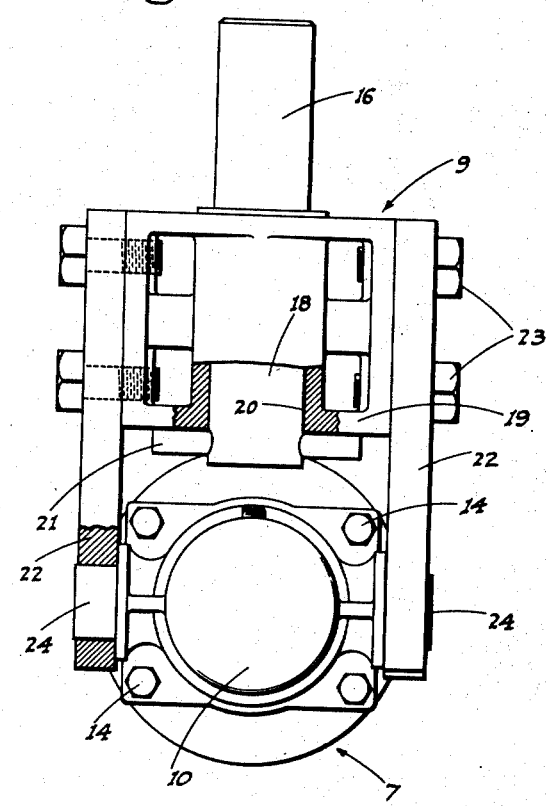
Fig. 2 is an outer end view of one of the mounts in connection with a bearing but detached from the implement frame.
Figure 3:
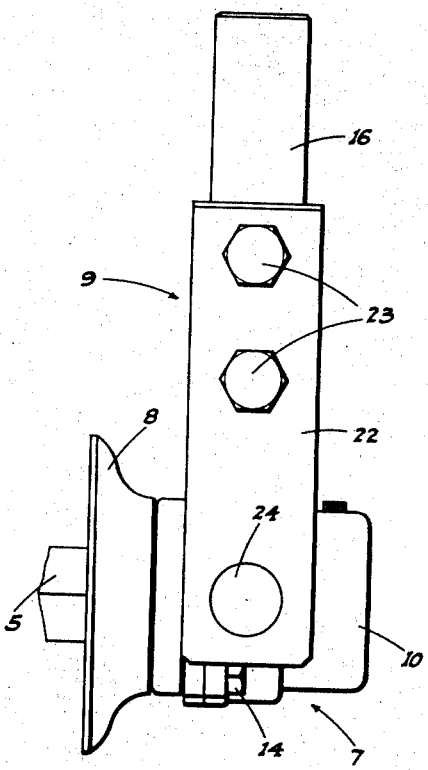
Fig. 3 is a side elevation of the same.
Figure 4:
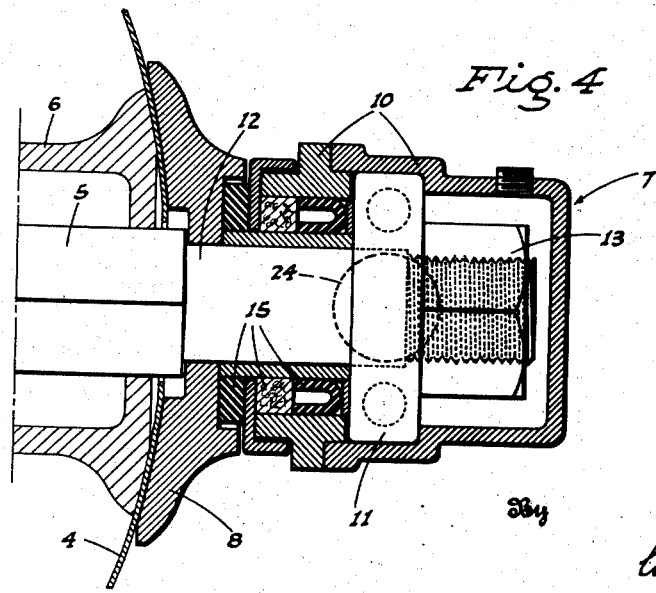
Fig. 4 is an enlarged sectional elevation of one bearing as used with the mount.

Referring now more particularly to the characters of reference on the drawings, the numeral 1 indicates, generally, the frame of a disc plow, which frame includes end beams 2. The numeral 3 indicates, generally, a disc gang coupled in draft relation to the frame 1 in the manner which will hereinafter appear; such disc gang including a plurality of disc blades 4 carried on a center shaft 5 and spaced thereon by spools 6.

At each end of the gang 3 the center shaft 5 is carried in a bearing unit, indicated generally at 7; there being end or spacer collars 8 between each bearing unit 7 and the adjacent disc blade 4.

The bearing units 7 are supported from the end beams 2 of the frame 1 by novel mounts, each of which is indicated at 9, and which mounts assure of proper alinement—automatically—of the bearing units 7 with respect to the center shaft 5.

Each bearing unit 7 comprises a two-part cap 10 which carries therein, in fixed position and intermediate its ends, an antifriction bearing 11; the adjacent end of the center shaft 5 being formed as a spindle 12 which is received in the bearing 11; there being a nut 13 threaded on the spindle outwardly of the bearing to hold the latter in place.

The two-part cap 10 is secured together by a plurality of cap screws 14, and between the bearing 11 and corresponding end collar 8 each bearing unit 7 includes an assembly of seals and retention rings, indicated generally at 15.

As each of the bearing mounts 9 is identical in structure, a description of one will suffice for both.

Each bearing mount 9 comprises an upstanding shank 16 fixed to the corresponding end beam 2 by any suitable means, as by welding 17.

The lower end portion of the shank 16, and which portion depends below the corresponding end beam 2, is formed as a generally vertical spindle 18. A block 19 having a bore 20 through which the spindle 18 projects, is turnable on the latter; the block being held against relative downward escape from the spindle 18 by a cross pin 21.

Front and rear yoke or side arms 22 are secured at their upper end portions to corresponding parts of the block 19 by bolts 23, and thence depend downwardly in straddling relation to the cap 10 of the corresponding bearing unit 7.

Such cap 10 is formed with front and rear substantially horizontal trunnions 24 turnably supported in the lower end portions of said arms 22.

With this arrangement each bearing unit 7 is mounted in connection with the related end beam 2 in a manner which permits the cap 10 and consequently the bearing 11 to maintain perfect alinement with respect to the spindle 12 of the center shaft 5; substantially universal adjustment being obtained by reason of the particular disposition of the spindle 18 and trunnions 24.

It should also be noted that the axes of the spindle 18 and trunnions 24 not only intersect each other, but also intersect the axis of the spindle 12 whereby a better and more balanced self-alinement of the bearing is attained.

Not only does the described mount assure of self-alinement of the bearing when the implement is in use and without detrimental effect due to distortion of the frame on account of draft conditions or the like, but the mount also makes possible easier initial assembly of the bearings in connection with the frame, with assured proper bearing alinement.

The mount 9 adjacent the disc blade 4 which has its convex face outermost is canted inwardly at the top, to the end that the corresponding end beam 2 may be closer to said blade and thus minimize projection of said portion of the implement frame. See the right-hand mount 9 in Fig. 1.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a shaft bearing unit which includes an annular bearing about the shaft and a cap about the bearing; trunnions rigid with and projecting axial alinement from opposite sides of the cap, parallel arms between which the cap is disposed and in which the trunnions are turnably supported, a member disposed between the arms above the cap, an attachment spindle turnably supported in the member in a plane centrally between the arms, and removable bolts rigidly connecting the arms and member as a unit and arranged to allow movement of the member, when one arm is removed upon removal of the bolts thereof, in a direction axially of the trunnion of the other arm and laterally away from said trunnion and the cap.

2. A structure as in claim 1, with means engaging the spindle above the member and holding said spindle against rotation, and a removable cross pin through the spindle below the member and positioned so as to be normally removable only when said one arm is removed.

MASICK C. MAGARIAN.

References Cited in the file of this patent

UNITED STATES PATENTS

| Number | Name | Date |
|---|---|---|
| 968,911 | Zerr | Aug. 30, 1910 |
| 1,665,957 | Glisky | Apr. 10, 1928 |
| 2,097,244 | Sjogren | Oct. 26, 1937 |
| 2,253,391 | Ohlendorf | Aug. 19, 1941 |

FOREIGN PATENTS

| Number | Country | Date |
|---|---|---|
| 14,666 | Great Britain | 1908 |